US009061580B2

(12) United States Patent
Gardien et al.

(10) Patent No.: US 9,061,580 B2
(45) Date of Patent: Jun. 23, 2015

(54) HOLLOW BODY COMPRISING AN ACCESSORY MODULE FASTENED TO THE WALL THEREOF, AND MODULE SUITABLE FOR SUCH A HOLLOW BODY

(75) Inventors: Stéphane Philippe Pascal Gardien, Paris (FR); Nicolas Le Clec'h, Margny les Compiegne (FR); Laurent Guyotte, Saint Martin Longueau (FR)

(73) Assignee: INERGY AUTOMOTIVE SYSTEMS RESEARCH (Societe Anonyme), Brussels (BE)

( * ) Notice: Subject to any disclaimer, the term of this patent is extended or adjusted under 35 U.S.C. 154(b) by 643 days.

(21) Appl. No.: 12/910,217

(22) Filed: Oct. 22, 2010

(65) Prior Publication Data

US 2011/0101006 A1    May 5, 2011

(30) Foreign Application Priority Data

Oct. 29, 2009    (FR) ..................................... 09 57634

(51) Int. Cl.
 *B60K 15/03* (2006.01)
 *B60K 15/035* (2006.01)
(52) U.S. Cl.
 CPC ..... *B60K 15/03177* (2013.01); *B60K 15/03519* (2013.01); *B60K 2015/03453* (2013.01)
(58) Field of Classification Search
 CPC ........... B60K 2015/03542; B60K 2015/03528; B60K 2015/03467; B60K 2015/0346
 USPC ............ 123/509, 516, 518; 137/15.08, 15.17, 137/15.18, 202, 587, 554, 553, 551; 220/4.14, 562; 29/407.09, 407.01; 251/318; 403/381, 331
 See application file for complete search history.

(56) References Cited

U.S. PATENT DOCUMENTS

| | | | | | |
|---|---|---|---|---|---|
| 4,582,219 | A | * | 4/1986 | Mortensen et al. | 220/326 |
| 4,960,153 | A | * | 10/1990 | Bergsma | 137/587 |
| 5,083,583 | A | * | 1/1992 | Benjey | 137/587 |
| 5,636,953 | A | * | 6/1997 | Jaeger et al. | 411/82.5 |
| 5,826,918 | A | * | 10/1998 | Bowles et al. | 285/24 |
| 5,931,353 | A | | 8/1999 | Guyomard et al. | |
| 5,931,514 | A | * | 8/1999 | Chung | 292/89 |
| 6,089,513 | A | * | 7/2000 | Cau et al. | 248/68.1 |
| 6,244,805 | B1 | * | 6/2001 | Everard | 411/182 |
| 6,422,261 | B1 | * | 7/2002 | DeCapua et al. | 137/202 |

(Continued)

FOREIGN PATENT DOCUMENTS

FR    2833890 A1    6/2003
JP    06193760 A  *  7/1994    ............. F16K 27/00

*Primary Examiner* — Fenn Mathew
*Assistant Examiner* — Chetan Chandra
(74) *Attorney, Agent, or Firm* — Oblon, McClelland, Maier & Neustadt, L.L.P.

(57) ABSTRACT

A hollow body (1) comprises an accessory module (2) fastened to the wall (13) thereof by being inserted by sliding into a slide (12) formed in said wall. The module (2) comprises a housing (20) and two flat and flexible wings (23) that extend from the housing in opposite directions, the distant edges (24) of said wings extending substantially parallel and being inserted respectively into the opposite grooves (14) of the slide, and the module also comprises at least one flexible fin (25) that extends from the housing, said fin (25) being shaped so that it is bent elastically during the sliding insertion of the module (2) into the slide (12) and so that its end (26) is facing a stop member (151) of the slide when the fin is not bent and is situated beyond the end of said slide in the direction of sliding.

20 Claims, 3 Drawing Sheets

(56) References Cited

U.S. PATENT DOCUMENTS

| | | | |
|---|---|---|---|
| 6,499,500 B2 * | 12/2002 | Rosseel | 137/15.17 |
| 6,742,536 B2 * | 6/2004 | Mills | 137/15.17 |
| 6,814,225 B2 * | 11/2004 | Belden et al. | 206/1.5 |
| 7,131,452 B2 * | 11/2006 | Potter et al. | 137/15.17 |
| 7,290,675 B2 | 11/2007 | Gombert et al. | |
| 7,389,789 B2 * | 6/2008 | Vulkan et al. | 137/315.08 |
| 7,748,397 B2 * | 7/2010 | Firtion et al. | 137/15.17 |
| 7,802,955 B2 * | 9/2010 | Jatzke | 411/508 |
| 7,829,819 B2 * | 11/2010 | DeMaria et al. | 219/122 |
| 8,042,523 B2 * | 10/2011 | Lee | 123/516 |
| 8,122,604 B2 * | 2/2012 | Jannot et al. | 29/897.2 |
| 8,495,803 B2 * | 7/2013 | Fiedler | 24/303 |
| 8,567,426 B2 * | 10/2013 | Mills | 137/15.17 |
| 8,580,064 B2 * | 11/2013 | Jannot et al. | 156/245 |
| 8,608,011 B2 * | 12/2013 | Asahara et al. | 220/562 |
| 2002/0043533 A1 * | 4/2002 | Gombert et al. | 220/4.13 |
| 2002/0174902 A1 * | 11/2002 | Beyer et al. | 137/587 |
| 2003/0015235 A1 * | 1/2003 | Spink | 137/15.08 |
| 2003/0141304 A1 * | 7/2003 | Franjo et al. | 220/562 |
| 2004/0086331 A1 * | 5/2004 | Iwamoto | 403/327 |
| 2005/0217735 A1 * | 10/2005 | Firtion et al. | 137/590 |
| 2006/0151505 A1 * | 7/2006 | Kobayashi | 220/562 |
| 2010/0037869 A1 * | 2/2010 | Lee | 123/519 |
| 2011/0101006 A1 * | 5/2011 | Gardien et al. | 220/669 |
| 2011/0284099 A1 * | 11/2011 | Mills | 137/171 |
| 2013/0127159 A1 * | 5/2013 | Honda et al. | 285/305 |

* cited by examiner

HOLLOW BODY COMPRISING AN ACCESSORY MODULE FASTENED TO THE WALL THEREOF, AND MODULE SUITABLE FOR SUCH A HOLLOW BODY

CROSS-REFERENCE TO RELATED APPLICATIONS

This application claims priority to French application N° 09.57634 filed on Oct. 29, 2009, the whole content of this application being incorporated herein by reference for all purposes.

TECHNICAL FIELD OF THE INVENTION

The present invention relates to a hollow body comprising an accessory module fastened to the wall thereof, in particular inside the hollow body, and also to a module suitable for such a hollow body. Such a hollow body, especially made from plastic, is typically a fuel tank, in particular for a motor vehicle. The accessory module may comprise one or more functional components such as, for example: a pump, a filter, a check valve, a valve or others.

BACKGROUND OF THE INVENTION

Typically, in the motor vehicle field, fuel tanks are equipped with such modules and, especially for reasons of safety and ease of integration in vehicles, it is sought to integrate most functional components of the engine fuel supply system inside the tank.

One general problem is that, due to the fact that the tank constitutes a hollow body that only comprises the bare minimum of orifices, and orifices that furthermore have the smallest possible size, it may be difficult to introduce and fasten the module(s) inside this tank, especially since a precise positioning may be required.

Systems of fastening via interlocking and clipping have already been proposed, for example in U.S. Pat. No. 6,499,500 and U.S. Pat. No. 7,290,675. In these systems, the module, after having been introduced into the hollow body via an orifice provided for this purpose, is inserted, perpendicular to the wall, into a housing provided for this purpose and snap-fastened thereto by elastic deformation of locking means provided for this purpose on the module. In such systems, the installation may be difficult since it is necessary to precisely position the module opposite its housing and to maintain this positioning while applying the locking force.

A fastening system is also known, from U.S. Pat. No. 5,931,353, in which the module is inserted by sliding into a slide formed in the wall of the hollow body. This slide has a general shape of a dovetail slide with rounded sides, and the module comprises parallel lips with corresponding rounded shapes in order to fit to the dovetail shapes and be able to slide therein. Furthermore, these lips may deform elastically so that, when the module is inserted by sliding into the slide of the hollow body, the lips are constrained and therefore exert a friction force intended to hold the module in place in the slide, and prevent the withdrawal thereof by sliding.

However, this system has the drawback of insufficient reliability due to the fact that the positioning and holding is provided solely by the friction between the lips of the module and the slide.

SUMMARY OF THE INVENTION

The objective of the present invention is therefore to solve the aforementioned problems, and the present invention aims, in particular, to provide a system for fastening such a module to the wall of a hollow body which is easy to put in place, can be carried out easily and at a lower cost, which allows simple and precise positioning, and reliably ensures that the position is held.

In view of these objectives, one subject of the invention is a hollow body comprising an accessory module fastened to the wall thereof, the module being inserted by sliding into a slide formed in the wall.

The hollow body according to the invention is characterized in that the module comprises a housing and two flat and flexible wings that extend from the housing in opposite directions, the distant edges of the wings extending substantially parallel and being inserted respectively into the opposite grooves of the slide, and the module also comprises at least one flexible fin that extends from the housing, the fin being shaped so that it is bent elastically during the sliding insertion of the module into the slide and so that its end is facing a stop member of the slide when the fin is not bent and is situated beyond the end of the slide in the direction of sliding.

Thus, as will be better understood later on, the fin acts as a lock for holding the module and preventing the sliding thereof in the direction opposite to its insertion in the slide. The wings of the housing constitute a slider capable of sliding in the slide, in a similar manner to the aforementioned prior art. The wings are here guided in movement between the opposite parallel grooves constituting the two sides of the slide.

While the module is being installed, the fin is deformed by bending during the sliding operation, and when the module reaches the desired position, the fin undergoes an elastic return to its original position, and in this position it is placed so that its end is facing a stop member firmly attached to the slide, preventing any involuntary sliding in the reverse direction to that of the installation. However, withdrawal remains possible if necessary, after a manual unlocking obtained by bending the fin in order to free it from the stop member.

According to one preferred embodiment, the slide is a slide of dovetail overall shape.

Preferably also, the module comprises two such fins that extend from the housing in opposite directions. The fins are then symmetrical with respect to the median plane of symmetry of the slide and of the wings of the module.

The fins are preferably shaped so that their ends are suitable for being able to slide in the grooves of the slide during the sliding insertion of the module into the slide, and the stop member of the slide is preferably one end of one of the ribs constituting the edges of the slide. During the installation of the module by sliding into the slide, it is the ends of the fins which are firstly inserted respectively into each lateral groove of the slide, this forcing a bending of the fins. Next, the sliding of the module leads to the ends of the wings of the module, which are themselves also bent elastically, also being inserted in the grooves. The continuation of the sliding operation causes the fins to emerge outside of the grooves of the slide, the fins thus being returned elastically to their initial position as soon as they emerge outside of the slide at the end of the sliding operation.

The preceding embodiments are particularly advantageous since they make it possible to produce the stop member simultaneously with the formation of the ribs that constitute the slide in the wall of the hollow body, typically made of molded plastic. However, the fin or fins could also be produced differently and the stop member could also be any other means constituting a positive stop for the fin(s), formed from the wall or added to this wall.

To ensure a precise positioning of the module in the hollow body, the latter comprises a stop that limits the sliding of the module, positioned relative to the slide so that the end of the fin is facing the stop member of the slide when the module is against the stop of the hollow body. Thus, to install the module it is sufficient to slide it as indicated previously, until it comes to rest. The fins then snap fasten automatically with the stop members of the slide, preventing the reverse sliding of the module, and ensuring its precise positioning in the hollow body. The stop is preferably a shape made by molding in the wall of the hollow body, against which one end of the housing comes butts.

According to one particular embodiment of the invention, the wings are shaped so that, when the module is fastened to the wall, with the wings inserted in the grooves of each side of the slide, the wings are bent elastically and press one end of the housing against the surface of the hollow body in one area located at the end wall of the slide between the grooves of the slide. Via this embodiment, the module is wedged elastically between the ribs of the slide and the wall of the hollow body, which blocks the module in position and prevents any movement thereof as soon as it is placed on the slide. To facilitate this bending and the introduction of the wings into the slide, these wings are preferably curved, so that, when in place in the grooves of the dovetail slide, they at least partially match the slope of the faces of the grooves, improving the holding of the wings, and ensuring, in addition to the pressure of the housing against the wall of the hollow body, a centering and a clamping of this housing between the ribs of the slide.

According to yet another preferred embodiment, the end of the housing pressed against the wall of the hollow body also butts, in the direction of sliding, against a stop made in the wall of the hollow body and positioned relative to the slide so that the end of the fin is facing the stop member of the slide when the end of the housing is against the stop of the hollow body. Thus, it is this end of the housing which ensures both:

pressing contact of the front face of this end of the housing against the wall of the hollow body, as indicated above, and sliding abutment by contact of the lateral wall of this end of the housing against the stop formed in the wall of the hollow body.

The hollow body may be of any type known especially in the general field of the storage of liquids. In particular, it may be a tank and, more particularly, a fuel tank, for example for a motor vehicle. The invention may also apply to other types of hollow bodies on or in which it is desired to fasten one or more accessory modules, it being possible for these modules to especially be various pumps, check valves or valves, level measurement devices, etc., or intermediate components comprising or supporting such members. Advantageously, the wings may bear duct fastening means in order to keep the ducts connected to the housing of the module, thus facilitating the installation of these ducts.

Another subject of the invention is an accessory module for a hollow body as described previously, characterized in that it comprises a housing and two flat and flexible wings that extend from the housing in opposite directions, the distant edges of the wings extending substantially parallel, and at least one flexible fin that extends from the housing, the fin being shaped so that its end can be brought substantially into alignment with the edge of one of the wings by elastic deformation, and so that at rest the end of the fin is out of alignment with the edge of the wing.

According to particular embodiments, the wings are curved, the fins are flat when at rest and the fins comprise a stiffener.

Other features and advantages will appear in the description which will be given by way of example of a motor vehicle fuel tank in accordance with the invention, and of the fastening inside this tank of a roll-over valve.

BRIEF DESCRIPTION OF THE DRAWINGS

Reference will be made to the appended drawings in which.

DETAILED DESCRIPTION OF THE PREFERRED EMBODIMENTS

In these figures, identical numbers represent identical components.

Figure 1:
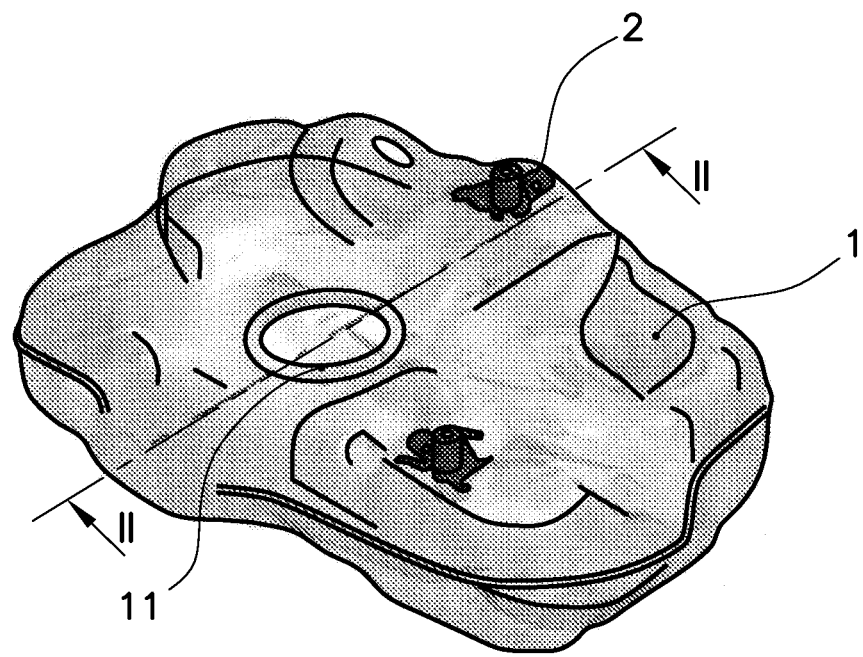
FIG. 1 is a perspective overview of the tank in accordance with the invention.
Figure 2:
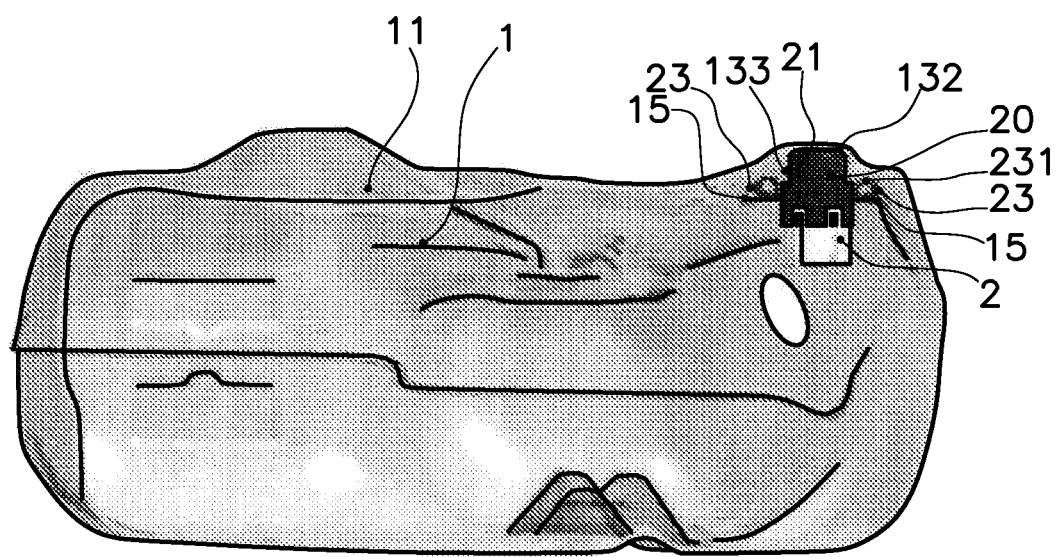
FIG. 2 is a view of the tank in cross section along the transverse cutting plane passing through the line II-II from FIG. 1, showing the position of the module in the tank.

The fuel tank 1 represented in FIG. 1 is a plastic tank, typically obtained by molding and welding from extruded sheets or from a cylindrical parison, in a manner known per se. It especially comprises an orifice 11 that makes it possible to access the inside of the tank 1, and an accessory module 2, comprising in this example a valve support housing 20, which is fastened inside the tank 1 after having been introduced through the orifice 11.

A dovetail slide 12 (seen in FIGS. 4 to 7) is formed in the wall 13 of the tank 1 during the molding of the tank, defining, on the sides of the slide, two parallel grooves 14 delimited by ribs 15. Each groove 14 has a slanting side 141, and a concave shape 131 which is made in the wall 13, in the area 132 of this wall constituting the end wall of the slide, so as to form a stop area 133.

Figure 3:
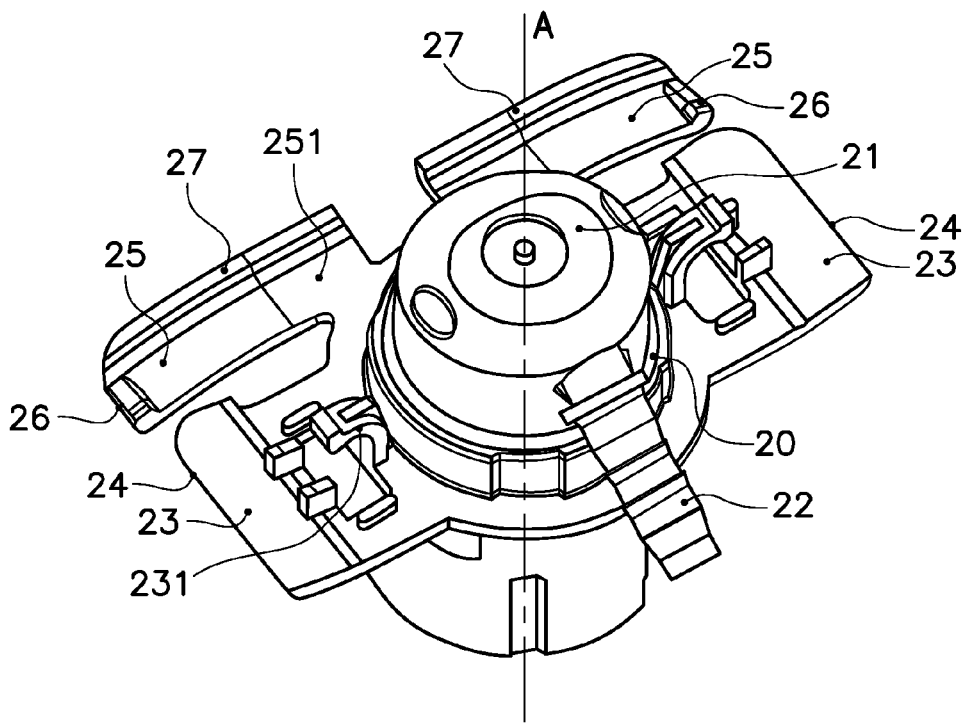
FIG. 3 is a perspective view of the module (valve support) comprising a valve.
Figure 4:
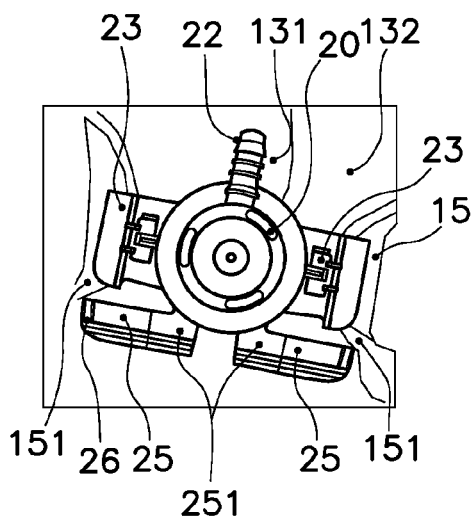
FIGS. 4 and 5 are detailed perspective views, from two different viewing angles, of the module in place in the tank.
Figure 5:
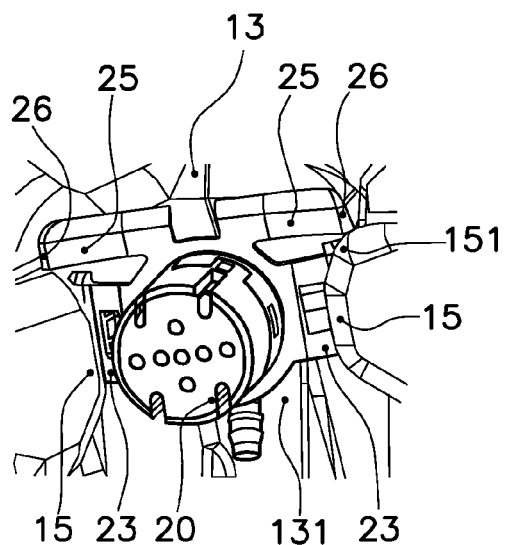
Figure 6:
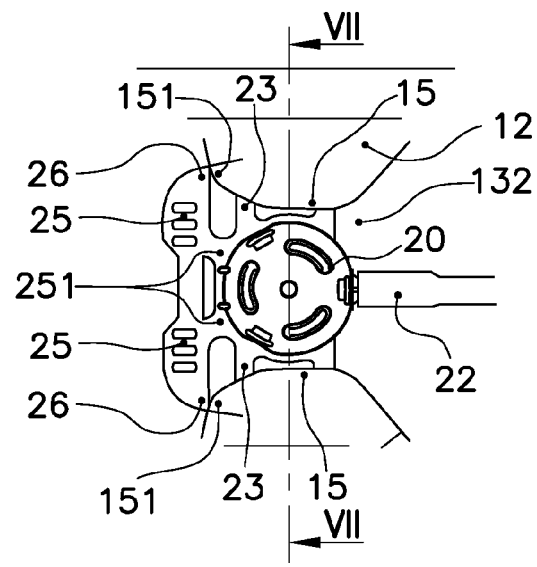
FIG. 6 is a detailed plan view in the direction of the arrow F1 of FIG. 2, of the module in place in the tank.

The module 2, represented separately in FIG. 3, comprises a valve support housing 20 also made of plastic, especially made of a thermoplastic resin. The housing 20 has a cylindrical overall shape with a main axis A and comprises, towards one end, an end wall 21 and a connection end-piece 22 suitable for connecting a flexible hose thereto and that extends perpendicular to the axis A.

The housing 20 comprises two flat and flexible wings 23, which are linked to the housing at the level of a same plane P1 (seen in FIG. 7) orthogonal to the axis A and extend from the housing opposite one another. The wings 23 are slightly curved towards the end wall 21, the edges 24 of the end of the wings 23 being substantially parallel to one another and to the plane P1, the edges 24 therefore being offset with respect to the plane P1 on the side of the end wall 21. The wings may comprise duct fastening means 231 in order to keep the ducts, not represented, connected to the housing, for example at the end-piece 22.

The housing 20 also comprises two flat fins 25 which extend substantially in the same plane P1, so that the ends 26 of the fins 25 are offset, in the direction parallel to the axis A, with respect to the edges 24 of the wings 23. The fins 25 comprise stiffeners 27 which reinforce the rigidity of the fins, while enabling the latter to bend in the areas 251 connecting these fins to the housing 20.

Figure 7:
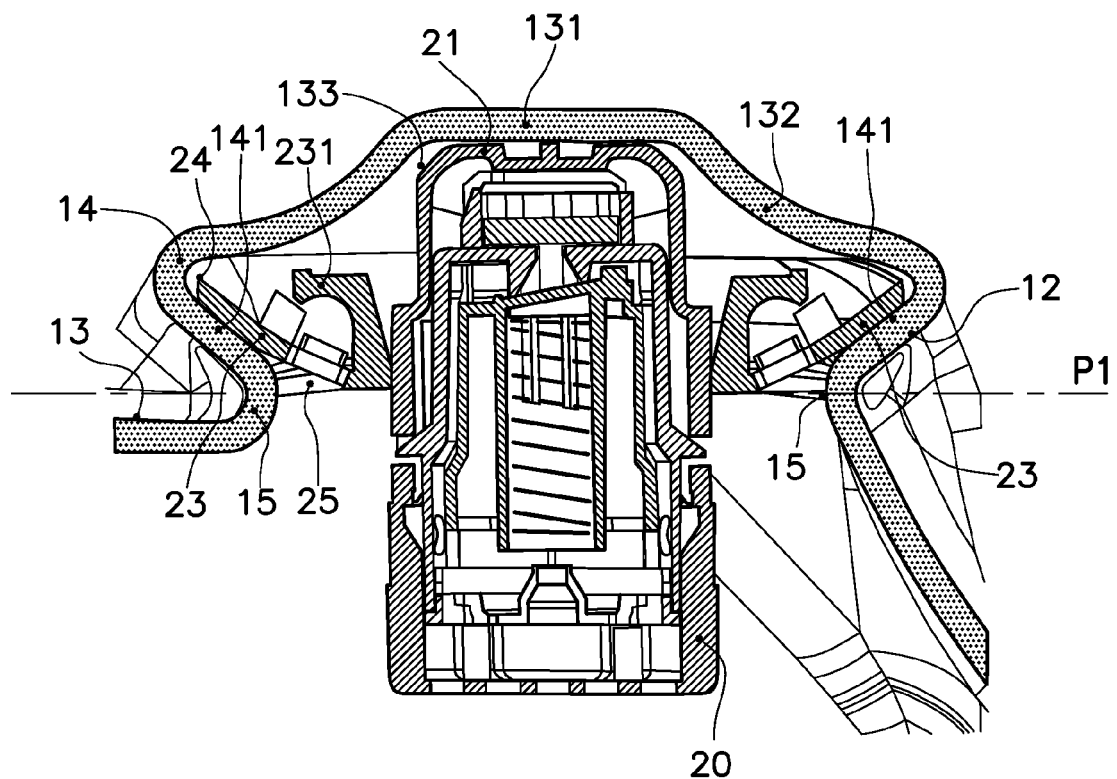
FIG. 7 is a view in cross section along the line VII-VII of FIG. 6.

The dimensions of the slide 12, and in particular the relative positioning of the slanting sides 141 with respect to the concave shape 131, are determined so that, when the housing is fastened to the tank, the wings 23 are elastically deformed by bending, as is clearly seen in FIG. 7, resting against the sides 141, and pressing the end wall 21 of the housing against the concave shape 131 of the wall of the tank. Thus, the module 2 is securely held in the slide 12 with no gap and with no possibility of displacement in the axial direction A.

Furthermore, the end wall 21 of the housing butts, in the direction of sliding of the slide, against the shape 133 of the wall of the tank. And the ends 26 of the fins 25 butt, in the opposite direction, against the ends 151 of the ribs 15. Thus, the module 2 is also immobilized with respect to movement in the direction of sliding of the slide.

As a result, the module 2 is securely kept fastened to the wall of the tank.

For the installation of the module 2, the latter is introduced manually into the tank through the orifice 11, then positioned opposite the slide 12, the end wall 21 of the housing being substantially against the wall area 131. The module then begins to be engaged in the slide 12 by slightly inclining the module to facilitate the insertion of the ends 26 of the fins into the grooves 14 of the slide, and by doing so giving rise to a bending of the fins in the flexible areas 251. The insertion movement is continued until the edges 24 of the wings 23 engage in the grooves, gradually straightening up the module so that its axis A returns to being perpendicular to the direction of sliding, the wings then being subjected to an elastic bending stress which, in reaction to the wings resting against the sides 141 of the grooves of the dovetail slide, presses the end wall 21 of the housing 20 against the wall 131.

The operation of sliding the module 2 continues until the end wall 21 of the housing is resting against the stop constituted by the shape 133 of the wall of the tank. The relative positioning of the ends of the ribs 15 and of the shape is determined so that, when the housing is slidingly abutted, the ends 26 of the fins 25 then disengage from the grooves and elastically return to their original position, then being opposite the ends 151 of the grooves 15, as is clearly seen in FIGS. 4, 5 and 6. The module is then blocked against sliding, but it remains possible, if necessary, to withdraw it after deliberately bending the fins 25 in order to be able to reinsert them in the grooves and carry out the sliding operation in the opposite direction to that of the installation of the module.

The module fastening system applies particularly for, as in the example which has just been described, fastening a valve or a valve support in a fuel tank. It will of course be possible to use the same system for fastening other accessories in fuel tanks or also in other types of hollow bodies, for example for fastening level measurement floats in tanks containing various liquids, etc.

The invention claimed is:

1. A hollow body comprising:
an accessory module fastened to a wall thereof by being slidingly inserted into a slide formed in said wall, wherein the module comprises a housing and two flat and flexible wings that extend from the housing in opposite directions, distant edges of said wings extending substantially parallel to each other and being inserted respectively into opposite grooves of the slide, and wherein
the module also comprises at least one flexible fin that extends from the housing, said fin being shaped so that the fin is bent elastically during the sliding insertion of the module into the slide and so that a free end of the fin disengages from the grooves and is facing a stop member of the slide when the fin is not bent and is situated beyond an end of said slide in the direction of sliding.

2. The hollow body according to claim 1, wherein the stop member is one end of one of several ribs constituting edges of the slide.

3. The hollow body according to claim 1, wherein the at least one flexible fin comprises two fins that extend from the housing in opposite directions.

4. The hollow body according to claim 3, wherein the fins are shaped so that the ends of the fins are suitable for being able to slide in the grooves of the slide during the sliding insertion of the module into the slide.

5. The hollow body according to claim 1, comprising a stop that limits the sliding of the module, positioned relative to the slide so that the end of the fin is facing the stop member of the slide when the module is against said stop of the hollow body.

6. The hollow body according to claim 5, wherein the stop is a shape made in the wall of said hollow body, against which one end of the housing butts.

7. The hollow body according to claim 1, wherein the wings are shaped so that, when the module is fastened to the wall, the wings are bent elastically and press one end of the housing against the surface of the hollow body in one area located at the end wall of the slide between the grooves of the slide.

8. The hollow body according to claim 1, wherein the wings are curved.

9. The hollow body according to claim 7, wherein an end of the housing pressed against the wall of the hollow body also butts, in the direction of sliding, against a stop made in the wall of the hollow body and positioned relative to the slide so that the end of the fin is facing the stop member of the slide when the end of the housing is against said stop of the hollow body.

10. The hollow body according to claim 1, wherein the wings bear a duct fastener in order to keep ducts connected to the housing.

11. The hollow body according to claim 1, wherein the slide is a slide of dovetail overall shape.

12. The hollow body according to claim 1, being a fuel tank.

13. An accessory module configured to be fastened to a wall of a hollow body by being slidingly inserted into a slide formed in said wall, said accessory module comprising:
a housing and two flat and flexible wings that extend from the housing in opposite directions, distant edges of said wings extending substantially parallel to each other, and at least one flexible fin that extends from the housing, said fin being shaped so that a free end of said fin can be brought substantially into alignment with one edge of one of said wings by elastic deformation, and so that the free end of the fin is out of alignment with said edge of the one of said wings when both the fin and the one of said wings are at rest without any elastic deformation.

14. The accessory module according to claim 13, wherein the wings are curved.

15. The accessory module according to claim 13, wherein the fin is flat when at rest.

16. The accessory module according to claim 13, wherein the fin comprises a stiffener.

17. The hollow body according to claim 1, wherein the slide includes an overall dovetail shape.

18. The hollow body according to claim 1, wherein the distant edges of said wings extending substantially parallel to each other are inserted respectively into the opposite grooves of the slide by elastically bending the wings.

19. The accessory module according to claim 13, wherein the wings are configured to be inserted into opposite grooves of the slide by elastically bending the wings.

20. The accessory module according to claim 13, wherein the fin is shaped so that an end of the fin is slidable in a groove of the slide during sliding insertion of the module into the slide.

\* \* \* \* \*